July 5, 1966
D. A. WALLACE
3,259,319
AMBULANT IRRIGATING DEVICE
Filed Nov. 25, 1964
6 Sheets-Sheet 1
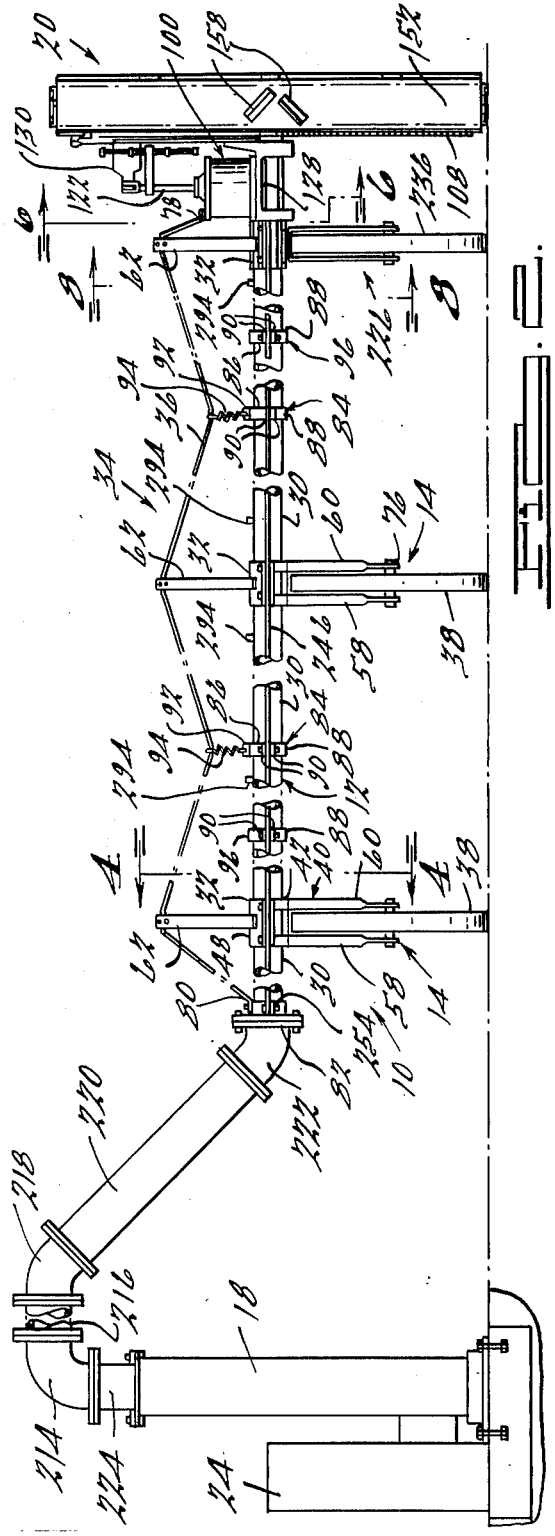
INVENTOR.
David A. Wallace
BY
Robert E. Harris
ATTORNEY.

July 5, 1966
D. A. WALLACE
3,259,319
AMBULANT IRRIGATING DEVICE
Filed Nov. 25, 1964
6 Sheets-Sheet 2
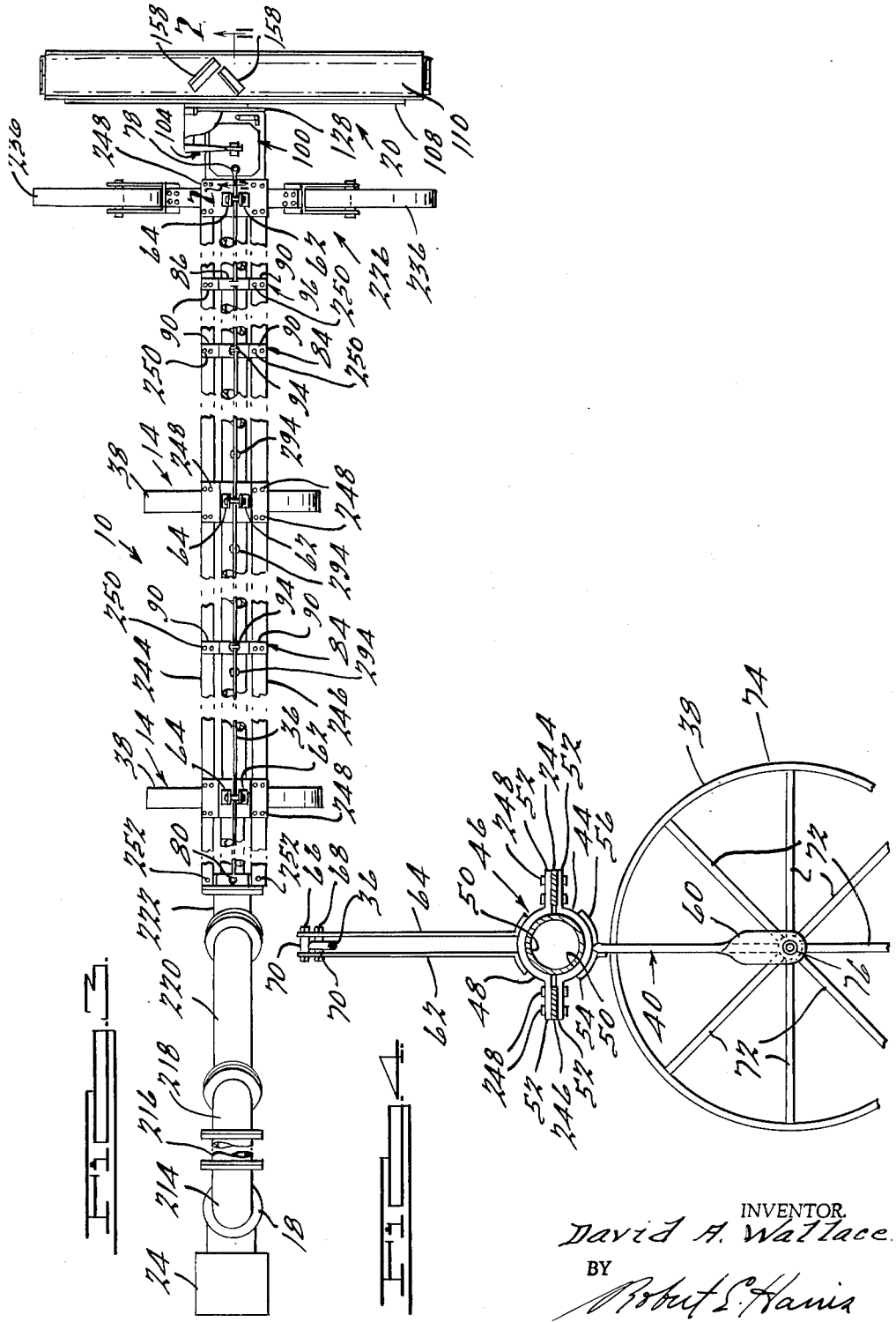
INVENTOR.
David A. Wallace
BY
Robert L. Harris
ATTORNEY.

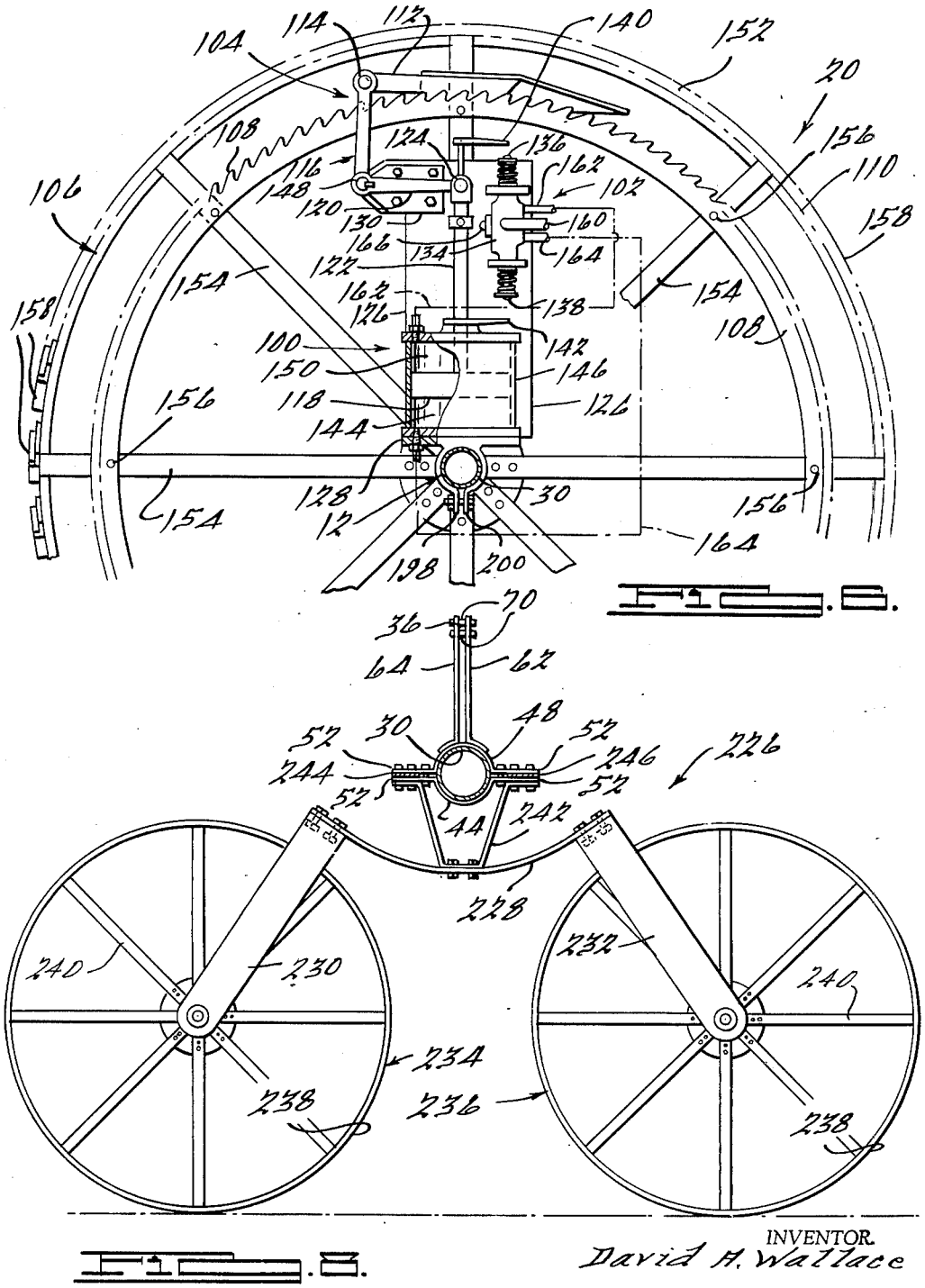

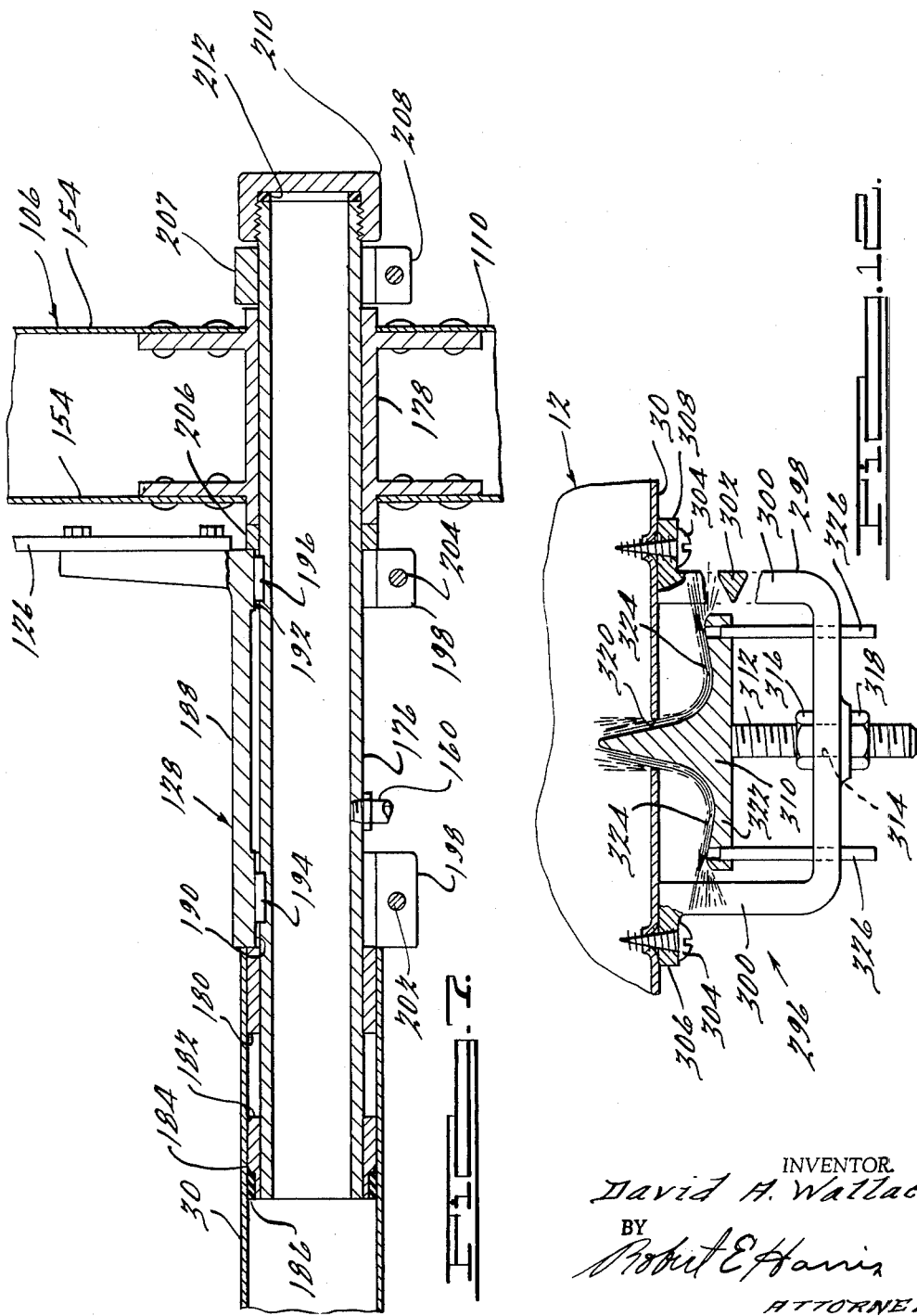

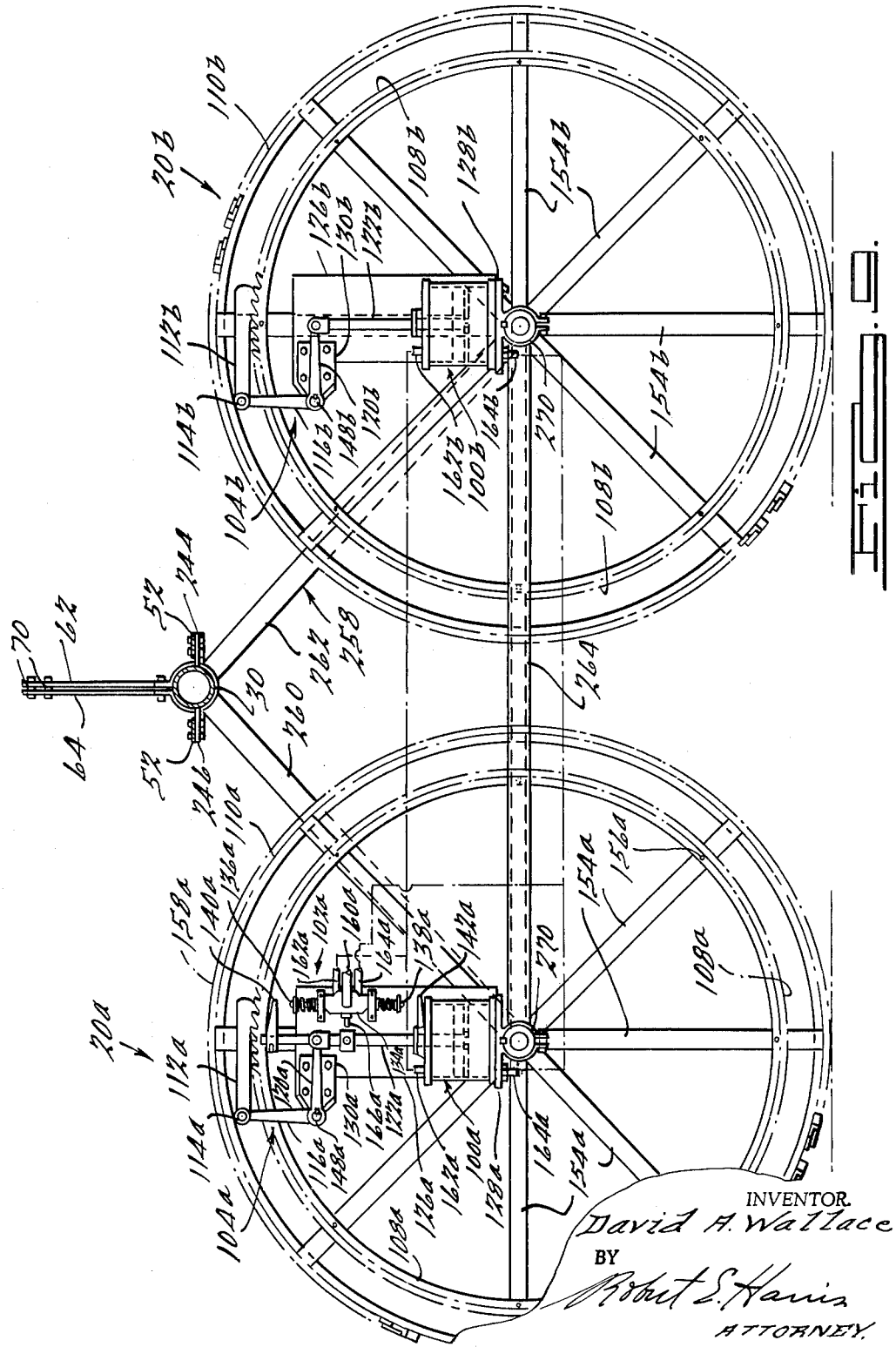

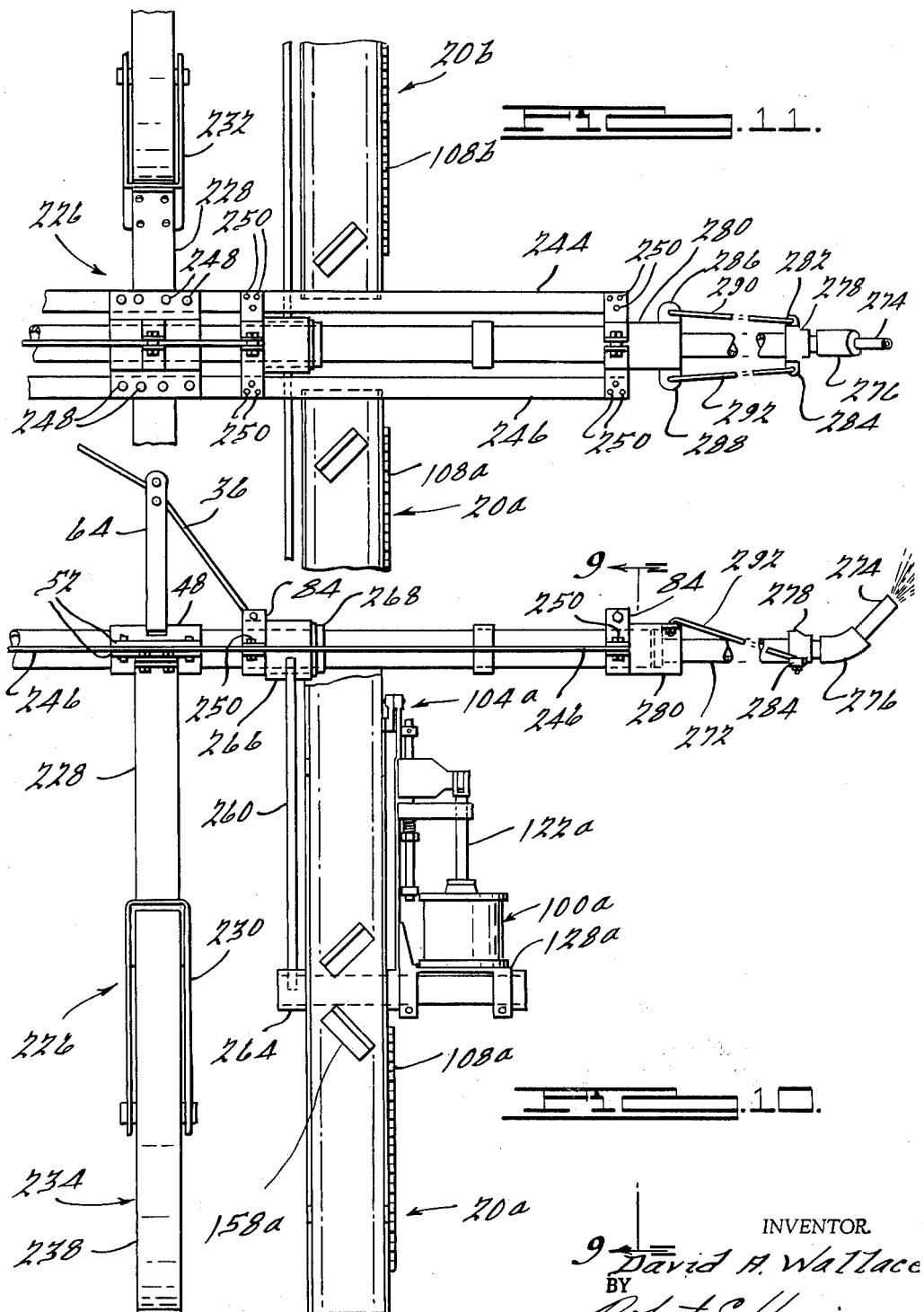

United States Patent Office

3,259,319
Patented July 5, 1966

1

3,259,319
AMBULANT IRRIGATING DEVICE
David A. Wallace, 100 Lewiston Road,
Grosse Pointe Farms, Mich.
Filed Nov. 25, 1964, Ser. No. 413,747
13 Claims. (Cl. 239—177)

This invention relates generally to an irrigation device and more particularly to a mobile self-propelled apparatus for irrigating large areas of land.

Various irrigation devices have heretofore been proposed. These have usually consisted of a plurality of power driving tractors disposed in laterally spaced relation so as to support a transverse water distributing pipe having water spray means thereon so that when the tractors are operated in unison the pipe, which is supported in overhead relation to the ground, will be pivoted generally near one end thereof and moved in a sweeping-like direction about the pivot over an area of land.

Such prior art irrigation devices have difficulties in at least two major respects. One of such difficulties or problems is establishing and maintaining properly correlated tractor speeds as between any two tractor assemblies. Another major problem resides in providing proper and adequate supporting structure or structures for the water distributing pipe. This problem is often aggravated because of the existence, in the same irrigation device, of the first-mentioned problem.

Various flexible pipe couplings and complex electrical speed controls have been proposed for use in combination with the propelling tractor assemblies. Further, the prior art has proposed the use of a plurality of self-propelled laterally spaced vertically extending towers, of substantial height, for supporting lengths of water pipe by means of a plurality of suspension cables each of which is secured at one end to the uppermost portion of a tower and secured at the other end in spaced relation axially along the water pipe. Such prior art arrangements have not proven to be entirely satisfactory.

Although the benefits of overhead irrigation are well recognized, the various irrigation devices heretofore proposed have not found general acceptance. This, it is believed, stems from what is often a prohibitive expense of the prior art arrangements. One of the factors contributing to the expense is the original cost of the apparatus which is significantly increased by both the various complex tractor speed control devices associated with the irrigation system per se and, in at least many instances, the relatively complex water pipe supporting structures. Another factor, often encountered, is the cost of leveling the ground which in many instances, in the use of prior art arrangements, has been found to be a necessity. Other costs such as the maintenance required for the various tractor speed control devices, have also retarded the acceptance of overhead self-propelled irrigation systems.

Accordingly, it is a general object of this invention to provide a novel and improved self-propelled irrigation apparatus which is capable of ambulatory action without the necessity of providing in combination therewith complex regulating means for correlating the speeds of the propelling tractor assemblies.

Another object of this invention is to provide an irrigation apparatus which is capable of propelling itself with a single propelling means.

2

Still another object is to provide an irrigation apparatus having a generally laterally disposed water distributing pipe with a propelling wheel mounted thereon at its end.

A further object of this invention is to provide an ambulating irrigation apparatus having a generally laterally disposed water distributing pipe supported in a frame-like arrangement permitting of relative flexibility or bending movements thereof in a generally vertical plane passing through the pipe so as to enable the irrigation apparatus to accommodate irregularities and undulations in the surface of the area to be irrigated.

Another object of this invention is to provide in an ambulatory irrigating apparatus a generally laterally disposed water distributing pipe supported in a frame-like arrangement which will permit relative flexibility or bending movements thereof in a generally vertical plane passing through the pipe while at the same time preventing undue bending of the pipe and frame-like arrangement in directions generally horizontal and transverse to the pipe.

Yet another object of this invention is to provide simple highly efficient sprinkling or nozzle means, carried by the water distributing pipe of the irrigation apparatus, which enables the precise application of controlled quantities of water while greatly reducing the quantity of water evaporated to the ambient atmosphere, as usually experienced with nozzle arrangements of the prior art.

Other more specific objects and advantages of this invention will become apparent when reference is made to the following description and accompanying drawings wherein:

FIGURE 1 is a schematic view illustrating the arrangement of an irrigation device, constructed in accordance with the teachings of this invention, in an area to be irrigated;

FIGURE 2 is an elevational view, of the irrigation apparatus comprising this invention, taken generally in the direction of the arrow A in FIGURE 1;

FIGURE 3 is a top plan view of the invention as shown in FIGURE 2;

FIGURE 4 is an enlarged cross-sectional view taken generally on the plane of line 4—4 of FIGURE 2;

FIGURE 5 is an enlarged fragmentary cross-sectional view of a typical pipe joint in the arrangement of FIGURES 2 and 3;

FIGURE 5-A is an enlarged fragmentary cross-sectional view of another pipe joint adaptable for use in the invention;

FIGURE 6 is an enlarged fragmentary view, party in cross-section, taken generally on the plane of line 6—6 of FIGURE 2;

FIGURE 7 is an enlarged fragmentary cross sectional view taken generally on the plane of line 7—7 of FIGURE 3;

FIGURE 8 is an enlarged cross-sectional view taken generally on the plane of line 8—8 of FIGURE 2;

FIGURE 9 is a view, similar to FIGURE 6, illustrating a modification and taken on the plane of line 9—9 of FIGURE 10;

FIGURE 10 is a fragmentary side elevational view of a modified form of driving arrangement;

FIGURE 11 is a fragmentary top plan view of the arrangement as shown in FIGURE 10; and FIGURE 12 is an enlarged fragmentary cross-sectional view of a typical spray nozzle.

Referring now in greater detail to the drawings, FIGURE 1 schematically illustrates the irrigation device 10 as being comprised of a relatively long water distributing pipe 12 mounted on a plurality of laterally spaced mobile ground-engaging supports 14 and connected at the center of the field 16 to a central water supply conduit 18. When rotated by the propelling mechanism 20 about the central supply pipe 18, the outer end of the distributing pipe 12 will traverse a circular path 22 to spray water on all of the land enclosed therein. If a pump has to be employed for supplying the water, such a pump 24 may be located in close proximity to the centrally disposed supply conduit 18. Of course, if desired, the pump 24 may be located outside of the field to be irrigated and a buried pipe may be employed for connecting the central supply conduit 18 to the pump 24.

As illustrated in FIGURE 2, the water distributing pipe 12 is comprised of a plurality of sections 30 of pipe, which are preferably of substantially uniform cross-sectional size, joined to each other in generally end-to-end relationship as by means of connecting sleeves 32 or by a standard flexing joint 31 as shown in FIGURE 5–A. Preferably, joint 31 is comprised of a collar portion 33, shrunk onto one end of a pipe section 30 and secured thereto as by welding, provided with an internal annular recess 35 for the reception therein of a suitable relatively resilient annular seal 37. The collar 33 and seal 37 form a bell-like opening for the resilient reception therein of one end of a cooperating pipe section 30.

In addition to the ground-engaging wheel support arrangements 14, the irrigating apparatus 10 is further provided with an overhead tension cable leveling or supporting arrangement 34. As illustrated, for example, in FIGURE 2, the leveling arrangement 34 is comprised of a tension cable 36 which cooperates with the intermediate support assemblies 14.

Each of the support assemblies 14, as also illustrated in FIGURE 4, is comprised of a wheel 38 situated within a wheel-engaging yoke 40 the upper end 42 of which is formed to provide the lower half or bracket 44 of a pipe clamping assembly 46. An upper cooperating bracket 48, as lower bracket 44, have a generally arcuate pipe-cradling portion 50 each end of which is provided with laterally extending clamping arms 52.

The lower bracket 44 may be welded to suitably bent end portions 54 and 56 of yoke legs 58 and 60. The upper bracket 48 has suitably secured thereto, as by welding, strap-like vertical extension members 62 and 64 which may be secured to each other at their uppermost ends by means of spaced bolts 66 and 68 provided with tubular spacers 70 intermediate the members 62 and 64. The cable 36, as also shown in FIGURES 2 and 3, is slidably received between the spacers 70. The wheel 38, preferably comprised of a plurality of spokes 72 carrying a rim 74, is suitably journaled as at 76 to the legs 58 and 60 of the yoke 40.

One end 78 of cable 36 is secured to the drive wheel assembly 20 while the other end 80 is anchored to a flanged pipe coupling 82. Preferably, the ends of cable 36 are provided with anchor screws (not shown) which permit threadable adjustment in order to fascilitate attaining the proper tension in cable 36.

Generally midway between successive support assemblies 14 is provided still another support arrangement 84 which, in cooperation with cable 36, serves as a hanger for the pipe section 30. The support arrangement 84 is comprised of upper 86 and lower 88 clamping brackets each provided with a centrally disposed pipe receiving portion each end of which is, in turn, provided with laterally extending clamping arms 90. The upper bracket 86 has an upwardly directed tab 92 formed thereon, or secured thereto, to which one end of a tension spring 94 is operatively connected. The other, upper end of spring 94 is connected to cable 36 so as to be supported thereby and in turn enable the resilient support of the pipe sections 30.

In addition to the support arrangements 84 are provided a plurality of pipe clamping assemblies 96 interspersed along the pipe 12. The clamping assemblies 96 are functionally similar to supports 84 except that tabs 92 are not provided. Accordingly, like reference numbers are used to identify like or similar elements of the clamping assemblies 96.

It is contemplated that the irrigation device, of the invention disclosed herein, would be generally modular. That is, pipe sections 30 would be of generally uniform length each having its ends received generally in and carried by successive support assemblies 14. For example, referring to FIGURE 2, the length of pipe section 30 generally between the assemblies 14 is preferably either twenty or forty feet.

As typically illustrated, for example, in FIGURE 5, the pipe sections 30 may be serially butted against a suitable annular seal 98 which is constrained from radial expansion by the cooperating upper and lower clamping brackets 48 and 44.

FIGURE 6, an enlarged fragmentary view, partly in cross-section, taken generally on line 6—6 of FIGURE 2, illustrates the power wheel assembly 20 as being comprised of a power cylinder assembly 100, control valve 102, ratchet mechanism 104 and drive or power wheel 106.

The power wheel assembly 106 is comprised of a ring gear 108, concentrically mounted on and secured to wheel 110, adapted to be engaged by a ratchet member or pawl 112 which is pivotally secured as at 114 to a bell crank 116. The power cylinder assembly 100 has its piston 118 operatively connected to the bell crank arm 120 by means of the piston rod 122. The pivotal connection 124 between piston rod 122 and crank arm 120 of course provides for some amount of lost motion which is required since shaft or rod 122 is limited to a linear reciprocating motion while crank 116 has an arcuate or angular motion.

A vertically extending plate 126 suitably secured to mounting base 128 serves to hold the pivot support 130 and cooperating control valve assembly 102. The control valve assembly 102 (commercially available and listed, for example, as valve No. 25–048–25 on pages 18 and 19 of the Valvair bulletin MV–63 published and copyrighted in 1963, by the Bellows Valvair Company of Akron, Ohio) has a body portion 134 with oppositely disposed actuating plungers 136 and 138 adapted to be respectively, in alternating sequence, engaged by and actuated by dogs 140 and 142 situated on and secured to the piston rod 122. The dogs are, of course, adjustably positioned axially along the rod 122 as is well known in the art.

Without specific reference to valve assembly 102, the power wheel assembly functions generally as follows:

Fluid under pressure is directed to a chamber 144 of cylinder 146 moving piston 118 and rod 122 upwardly. Such movement of rod 122 causes bell crank 116 to rotate counter-clockwise about its supporting pivot 148 moving the ratchet pawl 112 to the left which through engagement of gear 108 causes counter-clockwise rotation of wheel 110 about pipe section 30. The extent to which shaft 122 moves either upwardly or downwardly is controlled by the position of axially positionable dogs 140 and 142.

The purpose of dogs 140 and 142 is to change the operating position of the control valve assembly 102, through actuating plungers 136 and 138, which in turn determines to which chamber 144 or 150 of cylinder 146 the pressurized fluid will be directed. Chambers 144 and 150 are, of course, the variable chambers to either side of the piston 118.

As also illustrated in FIGURES 2 and 3, wheel assembly 106 is further comprised of an outer annular rim 152 and a plurality of spokes 154 which carry the gear 108 secured thereto as by screws 156. Additionally, a plurality of circumferentially spaced and staggered cleats 158 are secured to the outer periphery of rim 152 by any suitable means such as welding.

The body 134 of valve assembly 102 has a pressure fluid inlet conduit 160 operatively connected thereto leading from a suitable source of pressurized fluid as, for example, the pipe 176 illustrated in FIGURE 7. Additionally, fluid communicating conduits 162 and 164 are provided for directing pressurized fluid to and from chambers 150 and 144, respectively, of cylinder assembly 100. An exhaust conduit 166 is also provided in valve body 134 for, at times, exhausting some of the actuating or propelling fluid to the atmosphere.

Valve assembly 102 is of the type which controls the direction of flow of fluid directed thereto. That is, for example, when dog 142 sufficiently depresses plunger 138, a valving element within valve body 134 is caused to move to another stable position resulting in the pressurized fluid entering by conduit 160 to be directed through conduit 162. This causes chamber 150 to become pressurized. Simultaneously, conduit 164 is placed into communication with the atmosphere by means of exhaust conduit 166 causing chamber 144 of cylinder assembly 100 to be placed at a relatively low pressure. As a consequence of the pressure differential across piston 118, the piston and rod 122 are forced downwardly which motion continues until dog 140 depresses plunger 136 sufficiently to again move the said valving element to a different stable position wherein communication between conduits 160 and 164 and communication between conduits 162 and 166 is established. When this condition is achieved, the pressure differential is reversed and the piston 118 caused to move upwardly repeating the cycle.

FIGURE 7, an enlarged cross-sectional view taken generally in a vertical plane passing through the axis of pipe 12, illustrates the methods of mounting the wheel 106 and power cylinder assembly 100 mounting base 128 to the pipe 12. As best seen in FIGURE 7, pipe section 30 has fitted therein a pipe section 176 of reduced diameter which serves as an axle for hub 178 of wheel 110. A ring member 180 pressed into pipe 30 and about pipe section 176 is located near the end of pipe section 30 while a second ring-like member 182, also press-fitted onto both pipes, is inwardly from the end of pipe section 30. Attention should be called to the fact that ring member 182 is rounded as indicated at 184 and that a relatively resilient ring member 186 is provided near the end thereof. Any bending of pipe section 30 relative to pipe 176 generally in the vicinity of the juncture thereof will be cushioned by the resilient ring 186 thereby preventing a possible rupture of pipe 30 as might otherwise occur if ring 182 were extended so as to contact over its entire length the inner surface of pipe section 30.

The power cylinder mounting base 128, preferably a casting, has a planar surface 188 for the mounting thereon of the power cylinder assembly 100. Further, keyways 190 and 192 formed within base 128 receive keys 194 and 196 situated in and retained by the inner pipe 176. The bottom portion of base 128 is generally split or cut through and provided with appropriate tabs 198—198 and 200—200 which receive suitable screws 202 and 204 for frictionally locking the base 128 to pipe section 176. An annular spacer 206 maintains a prescribed axial relationship between base 128 and hub 178 while a friction band 207 also provided with screw-receiving locking tabs 208—208, maintains the wheel assembly 106 on the pipe 176. The end of pipe 176 may be suitably capped as by means of a threadably secured cap member 210 and inner seal 212.

The previously described rotation of wheel assembly 106, of course, causes rotation of the entire laterally disposed pipe 12 generally about the centrally disposed supply pipe 18. Any suitable pipe coupling members such as those illustrated at 214, 216, 218, 220 and 222 may be employed for joining the supply conduit 18 to pipe 12. Further, any suitable rotary coupling as indicated generally at 224 can be employed for joining pipe sections 214 and 18 to each other while still permitting relative motion therebetween.

In addition to the single wheel type of mobile support assemblies 14 another type, of support assembly 226, comprised of dual wheels, may be employed if desired to provide additional stability to the pipe 12. As best seen in FIGURE 8 (also see FIGURES 2 and 3) the support assembly 226 is comprised of a spring-like medial bridge 228 supporting at opposite ends thereof yoke members 230 and 232 by means of their respective bight portions. Each yoke has its respective free ends suitably journaled to the respective ground-engaging wheels 234 and 236. Each of the wheels is of course comprised of a suitable rim 238 and interconnecting spokes 240.

Intermediate the ends of bridge 228 is provided a pipe supporting pedestal member 242. Further, as in the support assemblies 14, upper and lower pipe clamping brackets 48 and 44 are provided for securing the pipe section 30 to the bridge 228. Vertical extension members 62 and 64 are, of course, provided, as previously discussed, for supporting the tension cable 36.

In furtherance of one of the objectives of this invention, to wit, providing an irrigation apparatus which permits bending of the water distributing pipe in the generally vertical plane while resisting any bending tendencies in the generally horizontal plane, laterally extending reinforcing plates or ribs 244 and 246 are provided on opposite sides of pipe 12 and secured thereto.

As shown, for example, in FIGURES 2, 3 and 4, the reinforcing ribs or plates 244 and 246 are relatively thin as compared to the pipe diameter and are also relatively wide as compared to their thickness. As also shown in FIGURES 2, 3 and 4, each of the ribs 244 and 246 is situated so as to have to be generally in a horizontal plane which passes through the axis of the pipe 12.

Each of the pipe clamping assemblies 46 of the support assemblies 14 has the tabs 52 secured to both sides of the reinforcing ribs 244 and 246 as by means of screws 248. The same, of course, applies to the double wheel pipe support assembly 226. In addition to being thusly secured to the pipe support assemblies 14 and 226, the plates 244 and 246 are further operatively secured to the pipe sections 30 as by the plurality of intermediate pipe clamping brackets 84 and 96 by means of the respective laterally extending tabs 90 and screws 250 as illustrated in FIGURES 2 and 3. As can also be seen in FIGURES 2 and 3, the radially innermost ends of the reinforcing plates 244 and 246 are secured, as by screws 252, to the tabs 254 formed integrally with pipe coupling 82 and oppositely disposed thereabout.

The provision of such reinforcing plates or ribs 244 and 246 enables the pipe 12 to continue to exhibit a considerable degree of flexure over its entire length (which may actually be in excess of 1300 feet) so as to follow the surface undulations of the area to be irrigated, while preventing undesirable bowing of the pipe 12 as viewed in the top plan view of FIGURE 3.

FIGURE 9 illustrates a modification of the invention wherein a dual drive wheel assembly 256 comprised of two wheel assemblies 20a and 20b is employed instead of the single wheel assembly as illustrated in the preceding figures. All elements of each of the wheel assemblies 20a and 20b which are like or similar to those of wheel assembly 20 are identified with like reference numbers followed by a suffix "a" or "b," respectively.

As will be noticed from FIGURE 9, only a single control valve 102a is necessary since the flow of fluid (water from pipe 12) under pressure to both cylinder assemblies 100a and 100b can be regulated by having a parallel conduit system leading from the control valve assembly 102a to each of the cylinder assemblies as illustrated.

As illustrated also in FIGURES 10 and 11, a generally triangular wheel supporting frame 258 is formed as by welding legs 260, 262 and base 264 together. The apex of the frame 258 is provided with a sleeve 266 which can be received about pipe section 30 and axially maintained thereon as by suitable collar-like retainers 268, one of which may in fact be a clamping bracket assembly 84. Near each end of frame 258 is provided a generally horizontally extending cylindrical member 270 which respectively serve as axles for the wheels 110a and 110b. The mounting bases 128a and 128b may, of course, be secured to the axles 270 in the manner described with reference to FIGURE 7.

It is contemplated that the dual drive wheel arrangement would be employed in instances, for example, where either extremely rough terrain was to be encountered or where relatively tall crops were growing. It is for that reason that the triangular frame with an apex-mounted water distributing pipe is employed. Approximate changes would of course have to be made in the several mobile pipe support assemblies 14 and 226 in order to accommodate the increased height of the water distributing pipe 12. Such changes, as illustrated in FIGURES 10 and 11, could be accomplished as by merely increasing the height of the pedestal portion 228 of support 226 and also making corresponding changes in the support assemblies 14 as by increasing the length of the wheel-supporting yoke 40.

The invention as illustrated in FIGURES 10 and 11 contemplates a still further modification; that is, providing a laterally projecting pipe section attachment 272 for irrigating a still larger area. A suitable nozzle 274 directed upwardly and radially outwardly can be operatively connected to pipe section 272 as by means of couplings 276 and 278 and the pipe section 272 itself can be secured to pipe section 30 by means of a reduction coupling 280.

Coupling 278 is provided with a pair of laterally extending tabs or anchor portions 282 and 284 oppositely disposed thereabout; coupling 280 is similarly provided with laterally extending anchor tabs 286 and 288. However, it should be noted that arms 286 and 288 are formed on coupling 280 in a manner so as to be at a level near the top thereof while arms 282 and 284 are formed as to be at a level near the bottom of coupling 278. Suitable tension rods or cables 290 and 292 are secured at their ends respectively to the tabs 282, 284, 286 and 288 so as to provide not only vertical support for the overhanging pipe section 272 but also lateral stability. The vertical support is achieved because of the vertical inclination of the cables 290 and 292 resulting from the vertical placement of tabs 282, 284, 286 and 288, while the lateral stability is achieved as a result of the arms 286 and 288 being positioned further from the axis of pipe 12 than arms 282 and 284 thereby causing the tension cables 290 and 292 to assume a somewhat radiating position (with respect to the axis of pipe 12) as viewed in FIGURE 11.

In view of the description of the invention thus far, it should be apparent that the invention would function properly with any type of water spraying nozzle means provided along the water distributing pipe 12 and schematically illustrated at 294 of FIGURES 2 and 3. However, in order to conserve water and thereby to further reduce operating expenses by possibly one-third as, for example, by the attendant reduction in pumping requirements and pipe sizes, it is proposed to employ an improved water spraying nozzle 296 as illustrated in FIGURE 12 which is an enlarged fragmentary cross-sectional view of a portion of a pipe section 30.

In FIGURE 12, the nozzle arrangement 296 is comprised of a generally U-shaped support 298 (having the leg portions 300 of a cross-section as illustrated generally at 302) secured to the pipe section as by means of screws 304 and cooperating flanges 306 and 308. Preferably the U-shaped support 298 is positioned so as to have flanges 306 and 308 in a direction generally axially of pipe 12.

A water directing and stopper cone member 310 having a threaded shank portion 312 is carried by the support 298 by means of an aperture 314 formed therethrough and cooperating nuts 316 and 318. By turning the nuts 316 and 318 the cone 310 can be moved closer to or away from a preformed water orifice 320 formed in the wall portion of pipe sections 30. Valve cone 310 also has a generally annular flared portion 322 formed integrally therewith in order to direct the water coming from orifice 320 radially outwardly as indicated generally by the arrows 324. The valve cone 310 may also be provided with a plurality of guide pins 326, secured within cone 310 and slidably journaled through support 298, for maintaining a concentric relationship between the cone 310 and orifice 320. The provision of such nozzle assemblies 296 enables the adjustment thereof so as to obtain with each partly overlapping circular sprinkling patterns as illustrated schematically at 328 of FIGURE 1.

Another important feature of the nozzle assembly is its location beneath the pipe 12. It has been discovered that in conventional irrigation devices wherein the nozzles spray water upwardly from the pipe and allow such water to return to the ground, that a great percentage is evaporated before it even starts to fall to the ground. The nozzle assembly of this invention overcomes this deficiency by directing water from below the pipe and aiming it generally towards the ground in a relatively low, flat, thin sheet-like spray. Consequently, the water particles are not individually exposed to the atmosphere for as long a period of time as required by the prior art which results in a great reduction in water evaporation.

Although only one preferred embodiment and two basic modifications of the invention have been disclosed and described, it is apparent that other embodiments and modifications are possible within the scope of the appended claims.

I claim:

1. A driving system for a wheel-mounted pipeline comprising a tubular supporting axle constituting a portion of the pipeline, a ground engaging drive wheel rotatably mounted on said axle, a water operated reciprocating motor, a platform secured to said pipeline having a mounting surface for securing thereto said motor, a drive gear secured to said wheel, motion transmitting means operatively connecting said reciprocating motor and said drive gear for intermittently driving said gear so as to cause rotation of said ground engaging drive wheel, and control valve means actuated by said motion transmitting means for causing reciprocation of said motor.

2. A driving system for a wheel-mounted pipeline comprising a tubular supporting axle constituting a portion of the pipeline, a ground engaging drive wheel rotatably mounted on said axle, a water operated reciprocating motor, a platform secured to said pipeline having a mounting surface for securing thereto said motor, a drive gear secured to said wheel, motion transmitting means supported on said platform operatively connecting said reciprocating motor and said drive gear for intermittently driving said gear so as to cause rotation of said ground engaging drive wheel, and control valve means supported on said platform actuated by said motion transmitting means for causing reciprocation of said motor, said platform being removably mounted directly to said tubular portion.

3. A driving system for a wheel-mounted pipeline comprising a tubular supporting axle constituting a portion of the pipeline, a ground engaging drive wheel rotatably mounted on said axle, a plurality of mobile wheel-mounted pipeline support assemblies spaced axially along said pipeline supporting said pipeline in a vertical direction, a water operated reciprocating motor, a platform secured to said pipeline having a mounting surface for securing thereto said motor, a drive gear secured to said wheel, motion transmitting means operatively connecting said reciprocating motor and said drive gear for intermittently driving said gear so as to cause rotation of said ground engaging drive wheel, and control valve means actuated by said motion transmitting means for causing reciprocation of said motor.

4. A driving system for a wheel-mounted pipeline comprising a tubular supporting axle constituting a portion of the pipeline, a ground engaging drive wheel rotatably mounted on said axle, a water operated reciprocating motor, a platform secured to said pipeline having a mounting surface for securing thereto said motor, a drive gear secured to said wheel, motion transmitting means operatively connecting said reciprocating motor and said drive gear for intermittently driving said gear as as to cause rotation of said ground engaging drive wheel, control valve means actuated by said motion transmitting means for causing reciprocation of said motor, and a plurality of longitudinal laterally extending reinforcing plates spaced on opposite sides of said pipeline and firmly secured thereto for preventing undue bending of said pipeline in a generally horizontal direction.

5. A driving system for a wheel-mounted pipeline comprising a tubular supporting axle constituting a portion of the pipeline, a ground engaging drive wheel rotatably mounted on said axle, a plurality of mobile wheel-mounted pipeline support assemblies spaced axially along said pipeline supporting said pipeline in a vertical direction, at least one of said mobile support assemblies including dual wheels mounted in tandem, a water operated reciprocating motor, a platform secured to said pipeline having a mounting surface for securing thereto said motor, a drive gear secured to said wheel, motion transmitting means operatively connecting said reciprocating motor and said drive gear for intermittently driving said gear so as to cause rotation of said ground engaging drive wheel, control valve means actuated by said motion transmitting means for causing reciprocation of said motor, and a plurality of longitudinal laterally extending reinforcing plates spaced on opposite sides of said pipeline and firmly secured thereto for preventing undue bending of said pipeline in a generally horizontal directional.

6. In a self-propelled sprinkling and irrigation apparatus for a relatively large section of land or the like, which includes a water distributing pipe, a plurality of supports spaced axially along said distributing pipe, a water power operated ground engaging drive wheel supporting an end of said distributing pipe, and a plurality of laterally extending reinforcing plates secured to said distributing pipe in a manner so as to be on opposite sides thereof and substantially in a plane passing through the center of said distributing pipe, said reinforcing plates permitting flexure of said water distributing pipe in a generally vertical plane while substantially precluding flexure of said pipe in a generally horizontal plane.

7. In a self-propelled sprinkling and irrigation apparatus for a relatively large section of land or the like, which includes a water distributing pipe, a plurality of wheel mounted supports spaced axially along said distributing pipe, a water power operated ground engaging drive wheel assembly supporting an end of said distributing pipe, and a plurality of laterally extending reinforcing plates secured to said distributing pipe in a manner so as to be on opposite sides thereof and substantially in a plane passing through the center of said distributing pipe, said reinforcing plates permitting flexure of said water distributing pipe in a generally vertical plane while substantially precluding flexure of said pipe in a generally horizontal plane, said drive wheel assembly comprising dual drive wheels mounted in tandem.

8. In a self-propelled sprinkling and irrigation apparatus for a relatively large section of land or the like, which includes a water distributing pipe, a plurality of wheel mounted supports spaced axially along said distributing pipe at least one of said wheel-mounted supports comprising dual wheels mounted in tandem, a water power operated ground engaging drive wheel assembly supporting an end of said distributing pipe, and a plurality of laterally extending reinforcing plates secured to said distributing pipe in a manner so as to be on opposite sides thereof and substantially in a plane passing through the center of said distributing pipe, said reinforcing plates permitting flexure of said water distributing pipe in a generally vertical plane while substantially precluding flexure of said pipe in a generally horizontal plane, said drive wheel assembly comprising dual drive wheels mounted in tandem.

9. In a self-propelled sprinkling and irrigation apparatus for a relatively large section of land or the like, which includes a water distributing pipe, a plurality of supports spaced axially along said distributing pipe, a plurality of adjustable nozzle assemblies spaced axially along on and beneath said distributing pipe, a water power operated ground engaging drive wheel supporting an end of said distributing pipe, and a plurality of laterally extending reinforcing plates secured to said distributing pipe in a manner so as to be on opposite sides thereof and substantially in a plane passing through the center of said distributing pipe, said reinforcing plates permitting flexure of said water distributing pipe in a generally vertical plane while substantially precluding flexure of said pipe in a generally horizontal plane.

10. An ambulant irrigating device for watering an area of ground including: a plurality of laterally spaced mobile support assemblies; a transverse water distributing pipe supported by said support assemblies; water delivery members connected to said pipe at spaced points therealong for delivering water to the ground; means for delivering water to said pipe; a ground-engaging drive wheel assembly for propelling said transverse pipe; and a pair of generally horizontally positioned longitudinal reinforcing plates situated along and secured to said water distributing pipe in a manner so as to be generally radiating outwardly of said pipe.

11. An ambulant irrigating device for watering an area of ground including: a plurality of laterally spaced mobile support assemblies; a transverse water distributing pipe supported by said support assemblies; at least one of said support assemblies including two tandem mounted ground-engaging wheels, water delivery members connected to said pipe at spaced points therealong for delivering water to the ground; means for delivering water to said pipe; a ground-engaging drive wheel assembly for propelling said transverse pipe; and a pair of generally horizontally positioned longitudinal reinforcing plates situated along and secured to said water distributing pipe in a manner so as to be generally radiating outwardly of said pipe.

12. An ambulant irrigating device for watering an area of ground including: a plurality of laterally spaced mobile support assemblies; a transverse water distributing pipe supported by said support assemblies; at least one of said support assemblies including two tandem mounted ground-engaging wheels, water delivery members connected to said pipe at spaced points therealong for delivering water to the ground; means for delivering water to said pipe; a ground-engaging drive wheel assembly for propelling said transverse pipe; and a pair of generally horizontally positioned longitudinal reinforcing plates situated along and secured to said water distributing pipe in a manner so as to be generally radiating outwardly of said pipe, said drive wheel assembly comprising two tandem mounted ground-engaging drive wheels.

13. In an ambulant irrigating device for watering an area of ground including: a plurality of laterally spaced mobile support assemblies; a transverse water distributing pipe supported by said support assemblies; water delivery members connected to said pipe at spaced points therealong for delivering water to the ground; means for delivering water to said pipe; a ground-engaging drive wheel assembly for propelling said transverse pipe; and a pair of generally horizontally positioned longitudinal reinforcing plates situated along and secured to said water distributing pipe in a manner so as to be generally radiating outwardly of said pipe, at least one of said water delivery members comprising a cone member supported by a strap-like member beneath said distributing pipe and adjustably positioned relatively to a water discharge orifice formed in a portion of the wall of said distributing pipe.

References Cited by the Examiner

UNITED STATES PATENTS

| | | | |
|---|---|---|---|
| 2,807,500 | 9/1957 | Clayton | 239—180 |
| 2,893,643 | 7/1959 | Gordon | 239—177 X |
| 2,940,672 | 6/1960 | Gaskell | 239—212 |
| 2,941,727 | 6/1960 | Zybach | 239—177 |

FOREIGN PATENTS

| | | |
|---|---|---|
| 217,436 | 9/1958 | Australia. |
| 227,737 | 4/1960 | Australia. |
| 635,676 | 1/1928 | France. |
| 290,664 | 8/1928 | Great Britain. |

OTHER REFERENCES 1,170,702, 5/1964, German Printed Application.

M. HENSON WOOD, JR., *Primary Examiner.*

V. WILKS, *Assistant Examiner.*